Patented Nov. 5, 1946

2,410,469

UNITED STATES PATENT OFFICE 2,410,469

ARYL ALKYL AMINO ALKANES AND COMPOSITIONS THEREOF

Gerritt John Van Zoeren, Holland, Mich., assignor to The Wm. S. Merrell Company, Cincinnati, Ohio, a corporation of Delaware No Drawing. Application October 12, 1940, Serial No. 360,962

3 Claims. (Cl. 260—570.8)

This invention relates to novel chemical compounds of the class of aryl-(alkyl-amino)-alkanes, including both the free amines and the amine salts. More particularly this invention relates to compositions for physiological and therapeutic use for topical and internal administration and especially to compounds for controlling contractile tissue, especially in the heart and blood vessels.

Prior to my invention a considerable number of compounds had been known as vaso constrictors or vaso dilators which have the basic chemical structure Ph—C—C—N<.

Considerable study has been devoted to compounds of this type and attempts have been made to correlate physiological properties with chemical structure. As reported in the literature these studies have indicated that in general the primary amines are less toxic than the secondary amines and in general that any increase in molecular weight by addition of methyl or alkyl groups beyond the phenyl propyl primary amines will result in increased toxicity.

I have now found that, in certain of these compounds, the change from primary to secondary amines results in a decrease in toxicity and that secondary amines corresponding to the amines within this group are very valuable for therapeutic uses and particularly as mild vaso constrictors, or vaso dilators.

I am giving below certain specific examples of my invention and its application in practical use and I am giving also certain modifications and alternatives, but it is understood that these are not intended to be exhaustive or limiting of the invention. On the contrary, I am giving these as illustrations and am giving herewith explanations in order fully to acquaint others skilled in the art with my invention and the principles thereof and a suitable manner of its application in practical use so that others skilled in the art may be able to modify the invention to adapt it and apply it in numerous embodiments each as may be best suited to the requirements of a particular use.

Example 1

Beta-phenyl-beta-ethyl-alpha-(methyl-amino) ethane, $C_6H_5CH(C_2H_5)CH_2NHCH_3$. This compound may be prepared, for example: A mixture of 100 g. beta-phenyl-beta-ethyl-alpha chloroethane and of approximately 50 g. of monomethylamine dissolved in about 150 cc. methanol is charged into a cooled autoclave. The autoclave is closed and heated for a number of hours, preferably in an oil bath, at about 130° C. It is then cooled in ice water and opened carefully. The contents are transferred into a distillation flask and heated gradually until the excess of monomethylamine is driven off, taking care that no boiling over takes place due to the too rapid evolution of the gas. Subsequently, a large proportion of the solvent methanol is distilled over up to about 70° C. and the residue is then diluted with about 300 cc. of water. The resulting aqueous alcoholic mixture is made distinctly acid to congo red with an acid such as hydrochloric and extracted with a solvent, such as benzene, to remove any benzene-soluble non-aminated products. The extracted aqueous alcoholic solution is then treated, while cooking, with an excess of strong caustic soda and benzene. The mixture is shaken and alowed to stratify. The benzene solution of the amine is washed twice in succession with small amounts of water and, after separation, is distilled directly from a small fractioning flask. After most of the benzene has been distilled, vacuum is gradually applied and the amine finally recovered as a colorless liquid, boiling at a constant temperature. The free amine shows vapor pressure at 75° F. of about 2.2 mm. and a vapor pressure of about 1 mm. is attained at about 65°.

Compared with the corresponding primary amines, beta-phenyl-beta-ethyl-alpha-amino-ethane, the volatility is not noticeably reduced. The vaso-constrictor activity is very mild, this factor being substantially greater in the primary amine, but the toxicity is much less in this methyl amino compound. Thus in substantially identical control tests on rabbits the minimum lethal dose (intravenous injection) for the hydrochloride of the primary amines was shown to be 30 mg. per kg. of body weight as compared with 40 mg. per kg. for the hydrochloride of the secondary amine.

Example 2

Beta-phenyl-beta-ethyl-alpha-(ethyl amino) ethane, $C_6H_5CH(C_2H_5)CH_2NHC_2H_5$. This compound may be made by the same method as indicated in the preceding examples.

The volatility of this compound is somewhat lower than that of the corresponding primary amine; and physiological activity in this compound has been reversed, the compound going even further in its surprising difference from its corresponding primary amine, and showing activity as a vaso-dilator, where the corresponding primary amine and the secondary amines of Examples 1 and 2, have a vaso-constrictor effect. The toxicities of the amine and amine salts of this example also are less than those of the corresponding primary amines and amine salts, although greater than those of the methyl amino compounds of Examples 1 and 2. In correspondingly controlled tests, the minimum lethal dose of the hydrochloride (for intravenous injection into rabbits) was shown to be 35 mg. per kg. of body weight.

Any of the above compounds may be used, for example, in a nasal inhalent composition as follows:

|  | Parts |
|---|---|
| Benzyl carbinol | 10 |
| Borneol | 20 |

The borneol is dissolved in the benzyl carbinol and to 30 parts of the resulting mixture are added 70 parts of the chosen amine. The relative proportions of benzyl carbinol, borneol and amine may be varied widely and if desired, the character of the aromatic mixture may be modified by the use of other suitable aromatic materials.

If this is to be used in the common inhalent tubes with the composition carried by a suitable absorbent pad, e. g., of cotton, within the tube, the more volatile compounds, especially the beta-phenyl-beta-ethyl-alpha-(methyl-amino) ethane will be chosen; and advantageously these will be used as free amines or as a salt of a weak acid, e. g., the carbonate. If less volatile compounds are used the composition may still be advantageous for this purpose if applied with external heat or atomization.

A composition suitable for use as nose drops for application of the vaso-constrictor in solution to the nasal mucosa may be as follows:

|  | Parts |
|---|---|
| Methyl salicylate | 1 |
| Oil of pine needles | 1 |
| Corn oil | 97 |

The materials are mixed in the proportions indicated and to the resulting mixture is added one part of the chosen free amine. The free amine may be replaced by its fatty acid salts and the aromatic character of the composition may be modified as desired by the use of other well-known aromatic substances such as menthol, thymol, camphor and the like. In place of the corn oil, mineral oil or any other suitable vegetable oil may be used. In cases where there are objections to an oil vehicle, the virtues of the compound may be exhibited in an aqueous base by the use of salts such as the hydrochlorides and sulfates.

For oral administration, for example, for control of blood pressure, a composition such as the following is suitable:

|  | Parts |
|---|---|
| Amine salt | 0.6 |
| Elixir adjuvans | 99.4 |

Alternately, the amine salt may be mixed with suitable diluents such as lactose and starch and filled into capsules or compressed into tablets.

The acid radical may have an important effect on volatility and where the volatility is important those radicals which give the most volatile salts will ordinarily be chosen. The acid radical may likewise affect other properties such as toxicity, stability, cost of manufacture, etc., and the particular salt to be used in any case will be chosen with these in view, as in the case of other pharmaceuticals already known to the art.

These compounds may also be combined with other compounds having physiological action in mixtures or in chemical combinations: e. g., acid radicals having special physiological action may be combined with the amines and administered as amine salts. Thus the antipyretic action of salicylates may be combined with the action of amines of my invention on uterine muscle by administering the amine salicylates. The acetyl salicylates of the amines may also be used to give combined action in this way.

Optically active isomers of the compounds herein disclosed may be used to advantage instead of the racemic compounds.

The present application is a continuation-in-part of my prior application, Serial No. 128,789, filed March 3, 1937.

What I claim is:

1. A compound selected from the class consisting of the free amine and the corresponding acid addition salts thereof in which the said free amine possesses the following structural formula

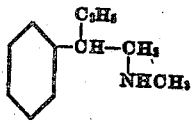

2. A compound selected from the class consisting of the free amine and the corresponding acid addition salts thereof in which the said free amine possesses the following structural formula

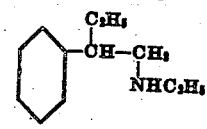

3. A compound selected from the class consisting of free amines and the corresponding acid addition salts thereof in which the said free amines possess the following structural formula

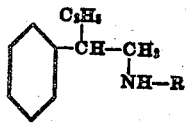

in which R is selected from the class consisting of methyl and ethyl.

G. JOHN VAN ZOEREN.